United States Patent
Grieshop

(10) Patent No.: US 10,694,657 B2
(45) Date of Patent: Jun. 30, 2020

(54) TALC APPLICATOR FOR USE WITH AGRICULTURAL EQUIPMENT AND OPERATIONS

(71) Applicant: J&M Manufacturing Co., Inc., Ft. Recovery, OH (US)

(72) Inventor: Dustan Grieshop, Fort Recovery, OH (US)

(73) Assignee: J&M Manufactuing Co., Inc., Ft. Recovery, OH (US)

( * ) Notice: Subject to any disclaimer, the term of this patent is extended or adjusted under 35 U.S.C. 154(b) by 0 days.

(21) Appl. No.: 16/165,397

(22) Filed: Oct. 19, 2018

(65) Prior Publication Data
US 2020/0120856 A1  Apr. 23, 2020

(51) Int. Cl.
| | | |
|---|---|---|
| A01C 1/06 | (2006.01) |
| A01C 15/00 | (2006.01) |
| B05C 19/00 | (2006.01) |
| G01F 13/00 | (2006.01) |
| B05B 5/16 | (2006.01) |
| B05C 19/04 | (2006.01) |
| B65D 88/54 | (2006.01) |
| B65D 88/28 | (2006.01) |
| B65G 33/14 | (2006.01) |
| B65G 33/16 | (2006.01) |

(52) U.S. Cl.
CPC .............. *A01C 1/06* (2013.01); *A01C 15/007* (2013.01); *B05B 5/1683* (2013.01); *B05C 19/008* (2013.01); *B05C 19/04* (2013.01); *B65D 88/28* (2013.01); *B65D 88/54* (2013.01); *B65G 33/14* (2013.01); *B65G 33/16* (2013.01); *G01F 13/005* (2013.01)

(58) Field of Classification Search
CPC ....... A01C 1/06; A01C 15/007; A01C 15/003; B05C 19/008; B05C 19/04; B05C 19/06; B65D 88/26; B65D 88/28; B65D 88/54; B65G 33/14; B65G 33/16; B65G 69/20; B05B 14/48; B05B 5/1683; G01F 13/00
USPC .......................................................... 118/308
See application file for complete search history.

(56) References Cited

U.S. PATENT DOCUMENTS

| | | |
|---|---|---|
| 1,812,911 A | 7/1931 | Walter |
| 2,794,577 A | 6/1957 | Van Leeuwen |
| 3,310,205 A * | 3/1967 | Meyer ..................... B41F 23/06 222/637 |
| 3,335,911 A | 8/1967 | Stutz |

(Continued)

*Primary Examiner* — Laura Edwards
(74) *Attorney, Agent, or Firm* — Wood Herron & Evans LLP

(57) ABSTRACT

A talc applicator is provided for use with agricultural equipment such as grain carts and seed tenders. The talc applicator includes a supply hopper with a trough, a discharge, a feed auger extending through the trough and discharge, and an agitator assembly positioned in the supply hopper immediately above the feed auger and trough. The agitator assembly includes a drive gear driven by the drive element of the feed auger and an elongated agitator element including at least two elongate bars and a plurality of angled crossbars connecting the two elongate bars. The agitator element rotates to assist with flow of talc into the trough so that the feed auger can move the talc to the other agricultural equipment. The talc applicator may also be provided with a hydraulic motor and a flexible flighting in the feed auger.

9 Claims, 7 Drawing Sheets

(56) References Cited

U.S. PATENT DOCUMENTS

| | | | |
|---|---|---|---|
| 3,642,254 A | | 2/1972 | Ternes |
| 4,202,438 A | * | 5/1980 | Rotilio .................. B65G 33/16 |
| | | | 198/524 |
| 4,491,420 A | | 1/1985 | Addison |
| 4,493,442 A | * | 1/1985 | Hanson, Jr. .............. A21C 9/04 |
| | | | 222/241 |
| 4,987,850 A | | 1/1991 | McCracken |
| 5,054,658 A | | 10/1991 | Aronie |
| 5,183,147 A | | 2/1993 | Callahan et al. |
| 5,848,871 A | | 12/1998 | Thiessen |
| 7,552,848 B2 | | 6/2009 | Salvati et al. |
| 8,851,822 B2 | | 10/2014 | Travis |
| 8,961,098 B2 | | 2/2015 | Mohns et al. |
| 9,637,037 B1 | | 5/2017 | Mohns et al. |
| 9,669,370 B2 | | 6/2017 | Hughes |
| 2010/0239399 A1 | * | 9/2010 | Hoogestraat ......... B65G 65/466 |
| | | | 414/310 |
| 2013/0146619 A1 | * | 6/2013 | Ozawa .................. B65G 65/46 |
| | | | 222/236 |
| 2014/0274682 A1 | | 9/2014 | Wu et al. |
| 2015/0072857 A1 | | 3/2015 | Reichert et al. |

* cited by examiner

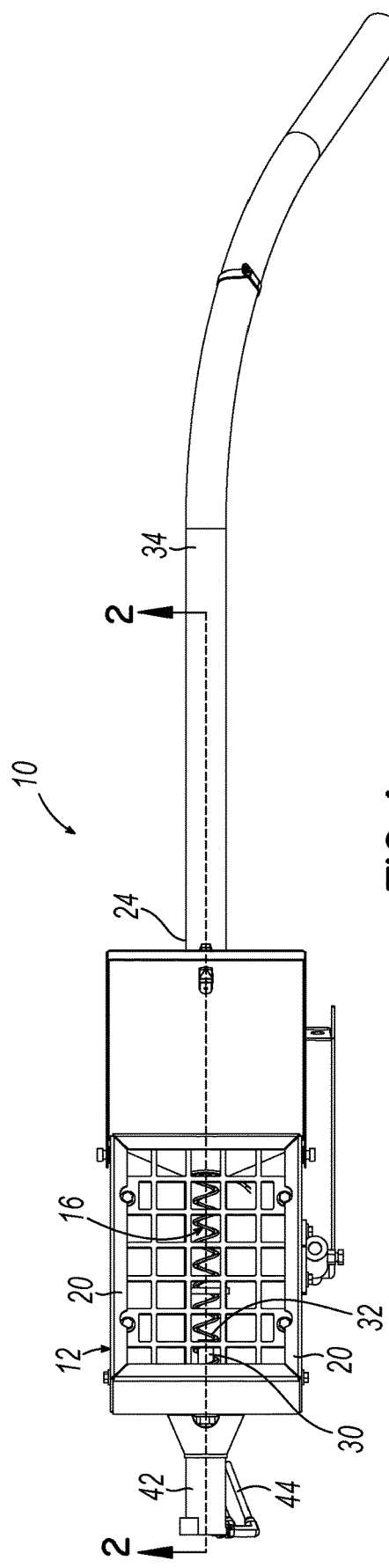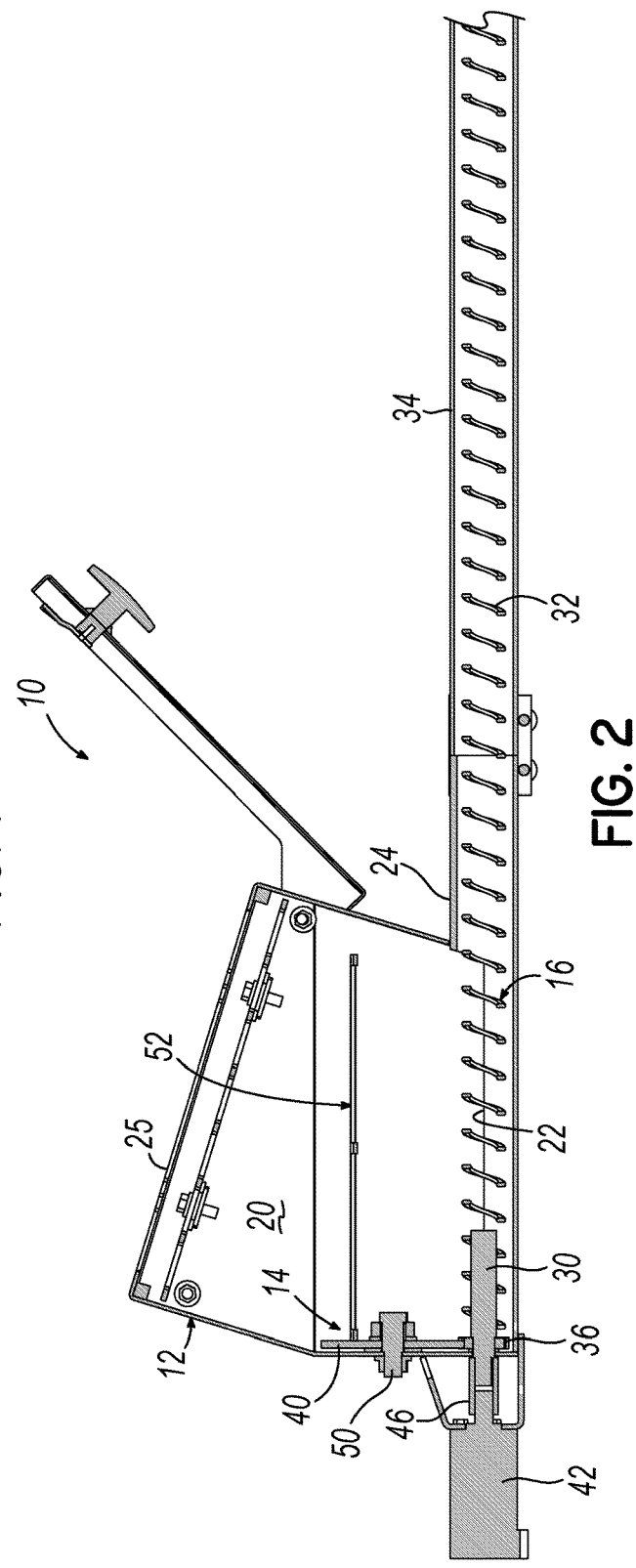
FIG. 1
FIG. 2

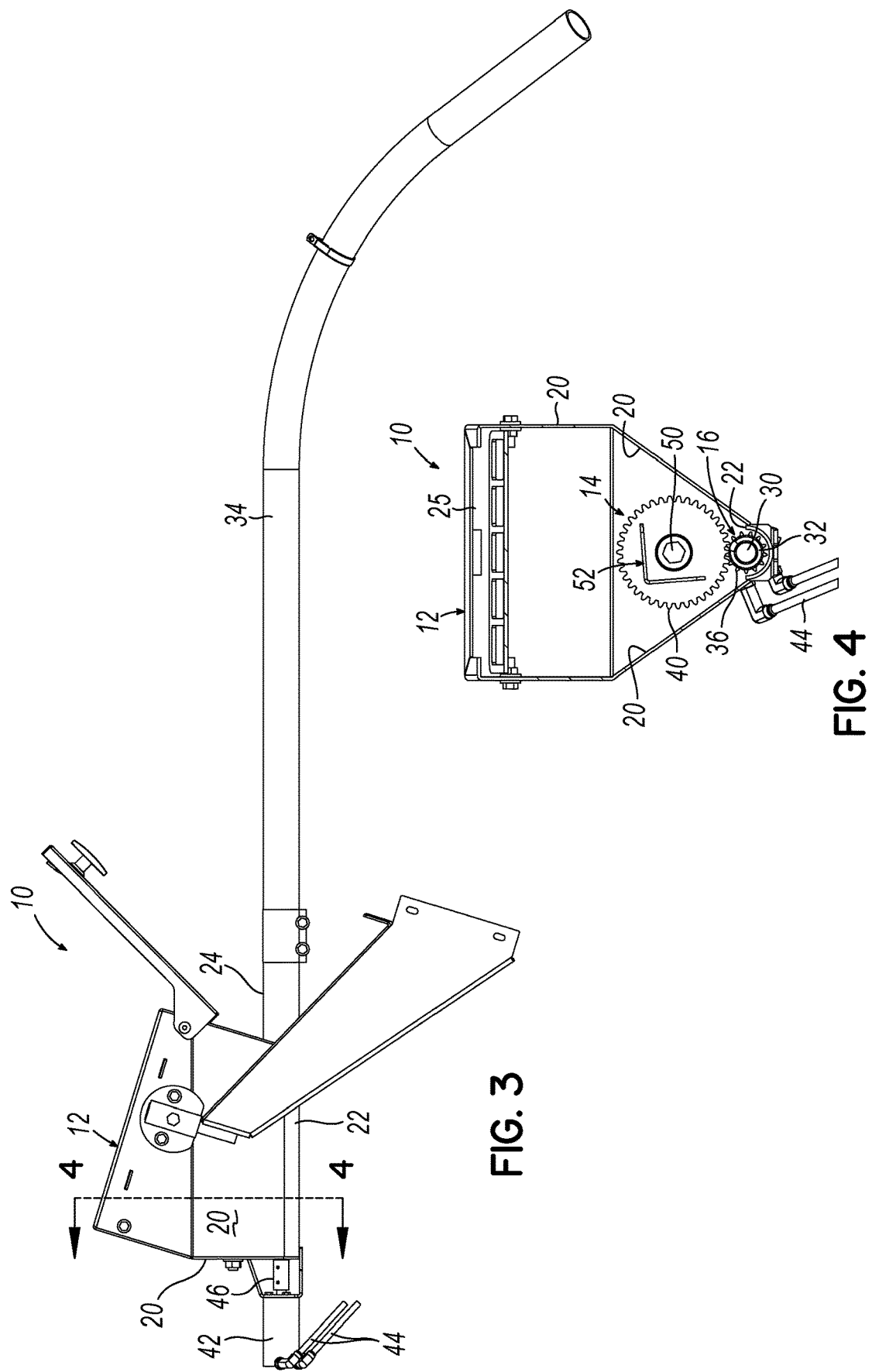

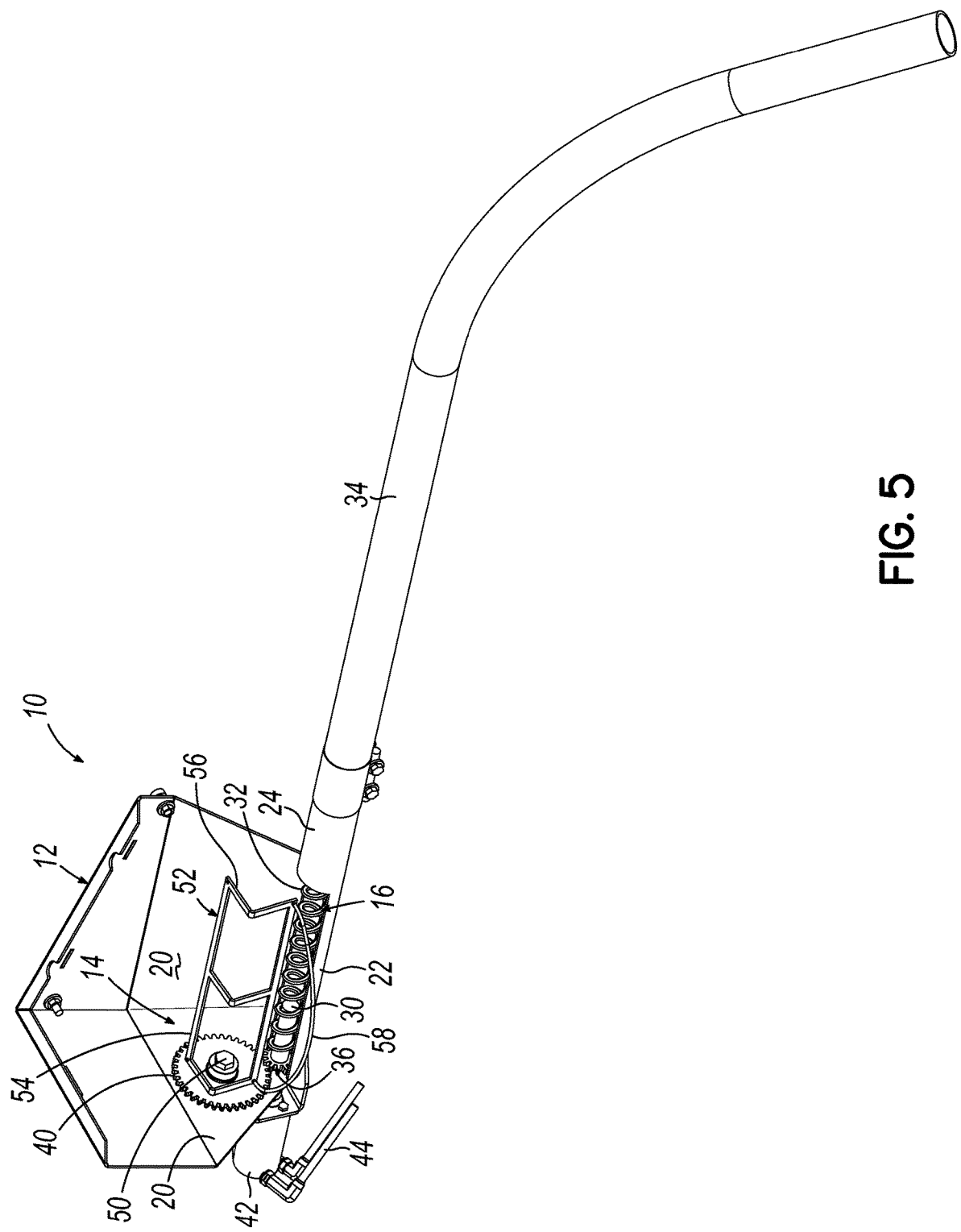

TALC APPLICATOR FOR USE WITH AGRICULTURAL EQUIPMENT AND OPERATIONS

TECHNICAL FIELD

The present invention relates generally to agricultural or farming equipment and, more particularly, to chemical applicators used with seed planting equipment to lubricate or dry the seed being handled by the agricultural or farming equipment.

BACKGROUND

In farming applications, chemical applicators are sometimes used to apply one or more chemicals to material being conveyed, such as seed being conveyed from a seed tender or from a grain cart. For example, graphite and talc are often used as dry lubricants for seed moving and planting operations. Talc operates as a dry lubricant when it is applied to seeds, but another primary role for talc is as a drying agent. Seed is subjected to air flows and ambient humidity when being moved within the farming equipment, and the seed itself as well as any pesticide coatings on the seed can pick up moisture from the ambient air during this process. That pickup of moisture can lead to additional friction and potential sticking/clumping points or jams within the equipment in the absence of the drying provided by chemicals such as talc. The problems with clumping and bridging of material is also present in some circumstances thanks to static electricity that sometimes builds up in the conveyor systems. To this end, the talc effectively smooths and dries the surface of seed to help avoid problems with clumping and/or bridging of material that may otherwise happen because of moisture in the environment.

Of course, the addition of talc to seed should be tailored such that enough talc is added to help prevent the potential flow problems described above, but not an excessive amount which will just be wasted by blowing into the atmosphere rather than coating the seed. Accordingly, talc applicators should typically be designed to carefully meter out flow of talc based on the movement of seed in the associated farming equipment. Many conventional talc applicators are designed to dispense talc at a constant, controlled rate, but this type of arrangement cannot account for variations in seed movement rate. More recent systems in this field have added variable speed drive mechanisms to address this problem of varying seed conveyance or application rates, but this adds potential complexities and added costs to the system.

Regardless of the design of the talc applicator, one further technical problem that must be addressed is the packing of the talc within the storage hopper of the talc applicator. Chemicals such as talc are typically not free flowing, which means the particles of the talc exhibit self-adherence qualities that can prevent an auger or another dispensing element from receiving a flow of talc to dispense to the seed tender, grain cart, or the like. As such, an agitator must typically be provided within the storage hopper to avoid blockages caused by the non-free flowing nature of chemicals such as talc. This agitator is typically another element like the dispensing element which must be powered with input energy, and these elements can add significant complexity and potential failure points within the talc applicator. These issues can be exacerbated when ambient conditions have high humidity.

There is a need, therefore, for further improvements in the field of chemical applicators such as talc applicators, which address these and other deficiencies of known designs.

SUMMARY

According to one embodiment of the present invention, a talc applicator is configured for use with agricultural equipment. The talc applicator includes a supply hopper having a plurality of sidewalls extending to a trough, and the talc applicator also includes a discharge in communication with the trough. A feed auger extends through the trough and the discharge. The feed auger is driven to rotate to force flow of talc from the supply hopper into and through the discharge for delivery to other agricultural equipment. The feed auger also includes a tubular conduit, a flighting extending through the tubular conduit, and a drive element configured to rotate the flighting. The talc applicator further includes an agitator assembly positioned in the supply hopper adjacent to and immediately above the feed auger and the trough. The agitator assembly includes a drive gear, which is engaged with the drive element of the feed auger to be driven concurrently, and an elongated agitator element connected to the drive gear for rotation therewith. The agitator element is defined by at least two elongate bars extending from the drive gear transverse to a plane defined by the drive gear and a plurality of angled crossbars extending between and connecting the at least two elongate bars to one another. The angled crossbars are spaced from one another along a longitudinal length of the agitator element. The agitator element is rotated to assist with flow of talc in the supply hopper into the trough for movement and delivery by the feed auger when the feed auger is rotated by the drive element.

In one aspect, each of the angled crossbars is an L-shaped bar. In one example, the plurality of angled crossbars includes three crossbars. A first of these is located at the drive gear, a second of these is located at an opposite end of the two elongate bars, and a third of these is in the middle between the first and second crossbars.

In another aspect, the agitator element also includes an elongate curved bar connected to one of the two elongate bars. The elongate curved bar is configured to wipe across sidewalls of the supply hopper adjacent the trough.

In a further aspect, the drive element of the feed auger includes a sprocket gear that rotates whenever the flighting is rotated. The sprocket gear is meshed in engagement with the drive gear of the agitator assembly.

In yet another aspect, the drive element of the feed auger is actuated by a hydraulic motor. The speed of the hydraulic motor can be controlled and varied to allow for varying rates of feed of talc from the talc applicator to be achieved. This arrangement can be advantageous when the talc applicator delivers talc to a conveyor moving seed to be planted by the other agricultural equipment, e.g., the speed of the hydraulic motor is made proportional to a speed of the conveyor moving seed. The hydraulic motor receives hydraulic fluid from at least one of a proportional control device or a control valve configured to vary flow of hydraulic fluid to vary the speed of the hydraulic motor.

In one aspect, the flighting of the feed auger is a flexible flighting configured to stretch and contract along a longitudinal length of the tubular conduit. When the various aspects described above such as a flex auger, hydraulic motor driving, and concurrently-driven agitator assembly and feed auger are combined, the talc applicator advantageously moves talc in a reliable manner out of the supply hopper and to the other agricultural equipment at any controlled rate that is desired, with a minimal level of complexity and minimized potential maintenance/failure points.

These and other objects and advantages of the invention will become more apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, explain the principles of the invention.

FIG. 1 is a top view of a talc applicator including a flex auger and an agitator assembly operatively connected to the flex auger, in accordance with one embodiment of the invention.

FIG. 2 is a side cross-section view of the talc applicator of FIG. 1, taken along line 2-2 in FIG. 1.

FIG. 3 is a side view of the talc applicator of FIG. 1.

FIG. 4 is a front cross-section view of the talc applicator of FIG. 3, taken along line 4-4 in FIG. 3.

FIG. 5 is a perspective view of the talc applicator of FIG. 1, with one of the supply hopper sidewalls removed to illustrate internal elements thereof.

DETAILED DESCRIPTION

Figure 6:
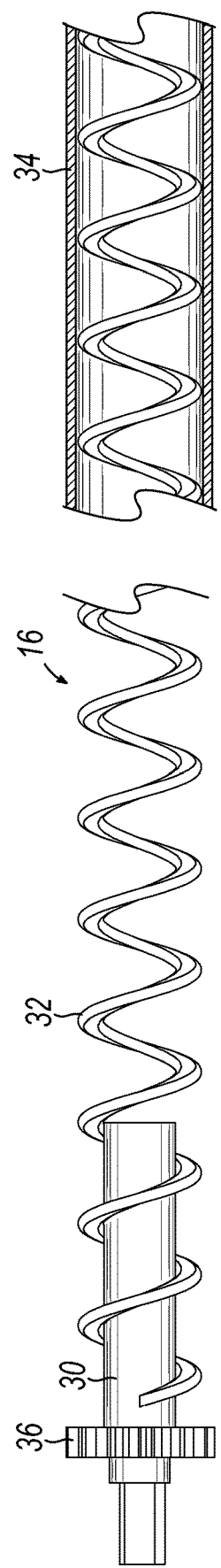
FIG. 6 is a side view of a flighting used with the flex auger of the talc applicator of FIG. 1.
Figure 7A:
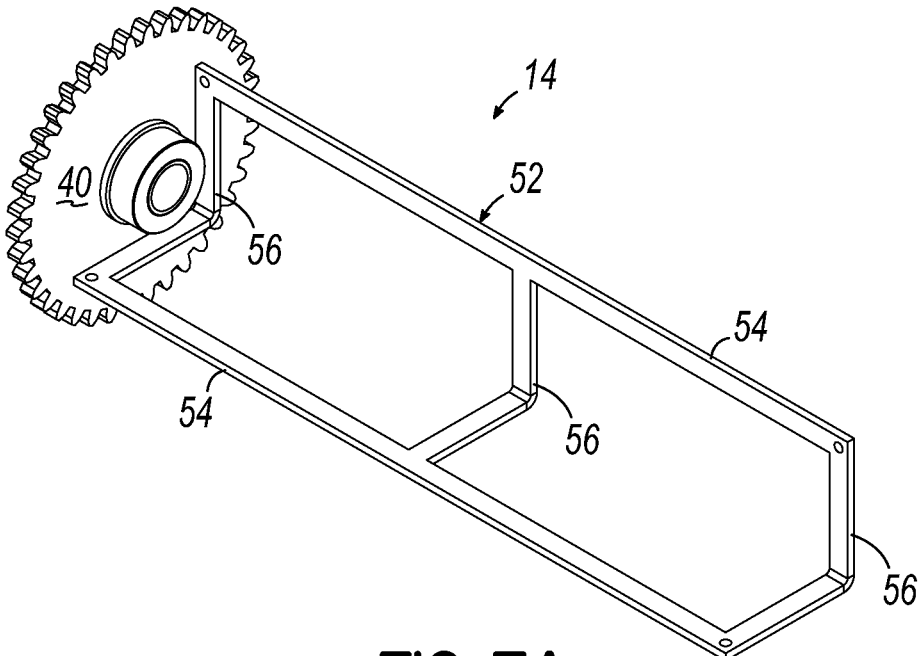
FIG. 7A is a perspective view of the agitator assembly used with the talc applicator of FIG. 1.
Figure 7B:
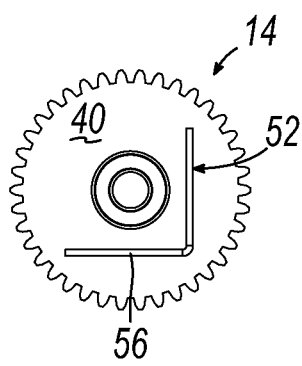
FIG. 7B is a front view of the agitator assembly of FIG. 7A.
Figure 7C:
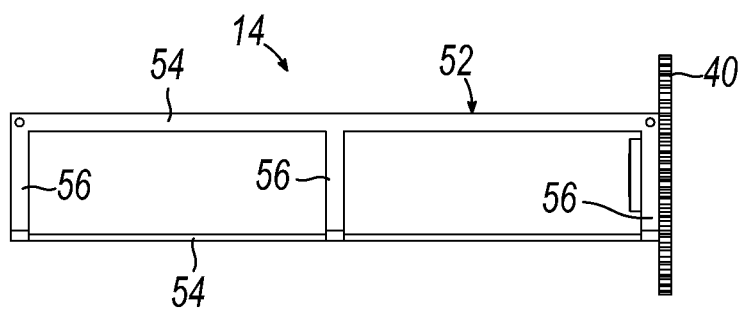
FIG. 7C is a side view of the agitator assembly of FIG. 7A.

With reference to the figures, and more specifically to FIGS. 1 through 5, a talc applicator 10 according to one embodiment of the present invention is illustrated. The talc applicator 10 is configured to reliably move a chemical such as talc from a supply hopper 12 to other agricultural equipment (not shown) such as seed tenders and grain carts. As chemicals such as talc are not free flowing, the talc applicator 10 is provided with an agitator assembly 14 that assures the talc flows towards a feed auger 16 that moves and discharges the talc. The agitator assembly 14 defines a simplified structure and is concurrently driven with the feed auger 16 to minimize the number of points where failure modes can occur or points where maintenance would be required. Thus, the talc applicator 10 improves the current art in the field of chemical applicators by addressing several of the design problems described in detail above.

Beginning with reference to FIGS. 1 and 2, the talc applicator 10 of this embodiment is shown in further detail. The supply hopper 12 is defined by a plurality of sidewalls 20 enclosing a storage space configured to receive a bulk supply of talc. The sidewalls 20 extend downwardly to a trough 22 defined at the bottom of the supply hopper 12. To this end, the sidewalls generally angle inwardly towards one another to create a funnel-like shape tapering towards the trough 22, which is generally elongated and extends along a longitudinal length of the supply hopper 12. This profile of the supply hopper 12 is also more clearly visible in FIG. 4. It will be understood that while one shape and size of supply hopper 12 is provided in these Figures, the sidewalls 20 may be modified in other embodiments without departing from the scope of the invention. The supply hopper 12 may be provided with other optional features like a grating shown at a top opening in FIGS. 1 and 2, but these features will not be described in detail herein as they are largely unrelated to the advantageous combination of features defining the inventive aspects of the talc applicator 10.

The talc applicator 10 also typically includes a discharge 24 provided at the bottom of the supply hopper 12 and in communication with the trough 22. The discharge 24 is typically formed from the same material as the supply hopper 12, and in this embodiment, the discharge 24 includes a tube that extends generally horizontally away from one end of the trough 22. Other configurations for providing an outlet from the supply hopper 12 may also be used in association with the talc applicator 10 (e.g., the discharge 24 may simply be defined by an aperture or some other similar structure). It will be understood that the supply hopper 12 also includes an inlet 25 for receiving talc material, as shown in FIGS. 2 and 4.

The feed auger 16 is now described with reference to FIGS. 1 through 6. In this regard, the feed auger 16 includes a drive element 30 that is connected to one end of a flighting 32 which extends in a longitudinal direction and spirals in a helix-type arrangement. The flighting 32 may extend over 90 inches in the longitudinal direction, for example. The flighting 32 is advantageously provided as a flexible piece in this embodiment, such that the feed auger 16 is what is known as a "flex auger." The flexible flighting 32 is capable of stretching or contracting along the longitudinal length as needed to adjust while moving a flow of talc through the trough 22 and discharge 24, and the flexible flighting 32 is also capable of extending through bends in the conduit as shown in the Figures. The flighting 32 is typically formed from a steel material, for example. The feed auger 16 also includes a tubular conduit 34 in this embodiment that connects to the discharge 24 and receives a portion of the flighting 32 that is located at an opposite end from the drive element 30. It will be understood that when the discharge 24 is provided as a tube as shown in FIG. 2, the tubular conduit 34 may be coupled to the discharge 24 using a standard pipe clamp or the like, and the tubular conduit 34 effectively defines a continuation or extension of the discharge 24 in such an arrangement. When put in rotation, the flexible flighting 32 reliably moves the talc (like a screw conveyor or drive) out of the trough 22 and along the tubular conduit 34 for delivery to other agricultural equipment as needed, and the flexible nature of these elements advantageously allows for delivery of talc to various locations relative to the location of the talc applicator 10.

As shown in FIG. 6, the drive element 30 of the feed auger 16 in this embodiment carries a sprocket gear 36 at a location proximate to the end of the flighting 32 coupled to the drive element 30 (for example, spaced from the end of the flighting 32 by about 0.25 inch). The sprocket gear 36 engages in a mesh contact with a drive gear 40 of the agitator assembly 14 described in further detail below. This meshed engagement is shown in FIGS. 4 and 5. Consequently, whenever the drive element 30 actuates to rotate the flighting 32, the sprocket gear 36 also rotates the drive gear 40 to move the agitator assembly 14. In other words, no separate drive motors or elements must be provided for the agitator assembly 14, and this relatively simple gear-based drive reliably works within the confines of the talc applicator 10. As a result, the talc applicator 10 is manufactured with less complexity and cost than systems having separate drive units for these two functions, and less maintenance and failure modes are provided in this embodiment. The talc applicator 10 therefore improves reliability and overall operational efficiency compared to known designs.

Returning to FIGS. 2 and 5, the drive element 30 of the feed auger 16 is operatively coupled to a hydraulic motor 42 in this embodiment. The hydraulic motor 42 is shown generally in black box form in the Figures because this component is generally obtained from commercially available designs and then coupled into the talc applicator 10. In some examples, the hydraulic motor 42 can be a White Drive hydraulic motor available under part number 125032JL5C3AAAAA or a Danfoss hydraulic motor available under part number 151G0036 OMM 32. The hydraulic motor 42 is driven by incoming flow of hydraulic fluid, and one example of such a fluid supply will be described in further detail below. However, in FIGS. 1 through 5, the supply lines 44 for the hydraulic fluid are shown extending to the motor 42. The hydraulic motor 42 is typically mounted on an exterior of the supply hopper 12 and then connected to the drive element 30 via a coupling 46, which is shown most clearly in the cross section of FIG. 2. The hydraulic motor 42 advantageously drives the feed auger 16 and thus also the agitator assembly 14 at a controllable, variable speed.

Now turning with reference to FIGS. 1 through 5 and FIG. 7, the agitator assembly 14 of this embodiment is shown in further detail. As noted above, the agitator assembly 14 includes a drive gear 40 that engages with a sprocket gear 36 on the drive element 30 of the feed auger 16. The drive gear 40 is typically mounted adjacent to one of the sidewalls 20 of the supply hopper 12 as shown in FIG. 2, with an axle 50 in this embodiment extending through the sidewall 20 to provide support for the drive gear 40. Much like the components of the feed auger 16, the agitator assembly 14 may also be referred to as a weldment because the components thereof are often welded together and formed from structurally rigid materials such as stainless steel.

In this regard, the agitator assembly 14 includes an elongated agitator element 52 coupled by welding or the like to the drive gear 40 along a side of the drive gear 40 facing away from the sidewall 20 of the supply hopper 12 it is adjacent to. The agitator element 52 therefore extends along a longitudinal length of the supply hopper 12 in a position immediately above the trough 22 and the feed auger 16, but still at the bottom of the storage space defined within the sidewalls 20 of the supply hopper 12. In the illustrated embodiment, the agitator element 52 is specifically formed from at least two elongate bars 54, which extend generally transversely from the plane defined through the drive gear 40 and towards an opposite end of the supply hopper 12, and a plurality of angled crossbars 56 extending generally parallel to the plane defined through the drive gear 40 and connecting the two elongate bars 54 to one another. In the illustrated embodiment of FIG. 7, there are three L-shaped bars defining the plurality of angled crossbars 56. One of the angled crossbars 56 is located at the drive gear 40 on one end of each of the elongate bars 54, another is located at an opposite end of the elongate bars 54 away from the drive gear 40, and a third is located between the first two angled crossbars 56. This arrangement provides a simple-to-construct framework-like agitator that can break up clumps of talc to assure consistent flow into the feed auger 16 and trough 22 as the agitator assembly 14 rotates within the supply hopper 12. It will be appreciated that more or differently-shaped/profiled bar elements may be provided to the agitator element 52 in further embodiments of the invention, so long as the reliability of commonly driving the agitator element 52 with the feed auger 16 is maintained to achieve the technical objectives described above. For example, the angled crossbars 56 may be curved elements that extend in a non-parallel arrangement relative to the drive gear 40, and the elongate bars 54 may extend in a non-linear path or in an angled manner from the drive gear 40. To this end, the agitator element 52 may include alternative forms of framework that are capable of rotating with the drive gear 40 to break up clumps or blockages of flow of talc within the supply hopper 12.

In one such example, the agitator element 52 may be provided with additional curved and/or flexible bar(s) 58 or similar elements connected to one or both the elongate bars 54. Such a curved bar 58 is shown in FIG. 5. The elongate curved bar 58 may be configured to extend radially outwardly from the axis of rotation for the agitator assembly 14 to wipe across the surfaces of the sidewalls 20 of the supply hopper 12 adjacent the trough 22. Such an arrangement can assure that no clumping or jamming of the talc occurs along those sidewalls 20. Of course, such additional structures or elements can be re-designed in form (to be wire elements or something other than a bar) can be omitted in some embodiments of the invention without departing from the scope thereof.

Figure 8:
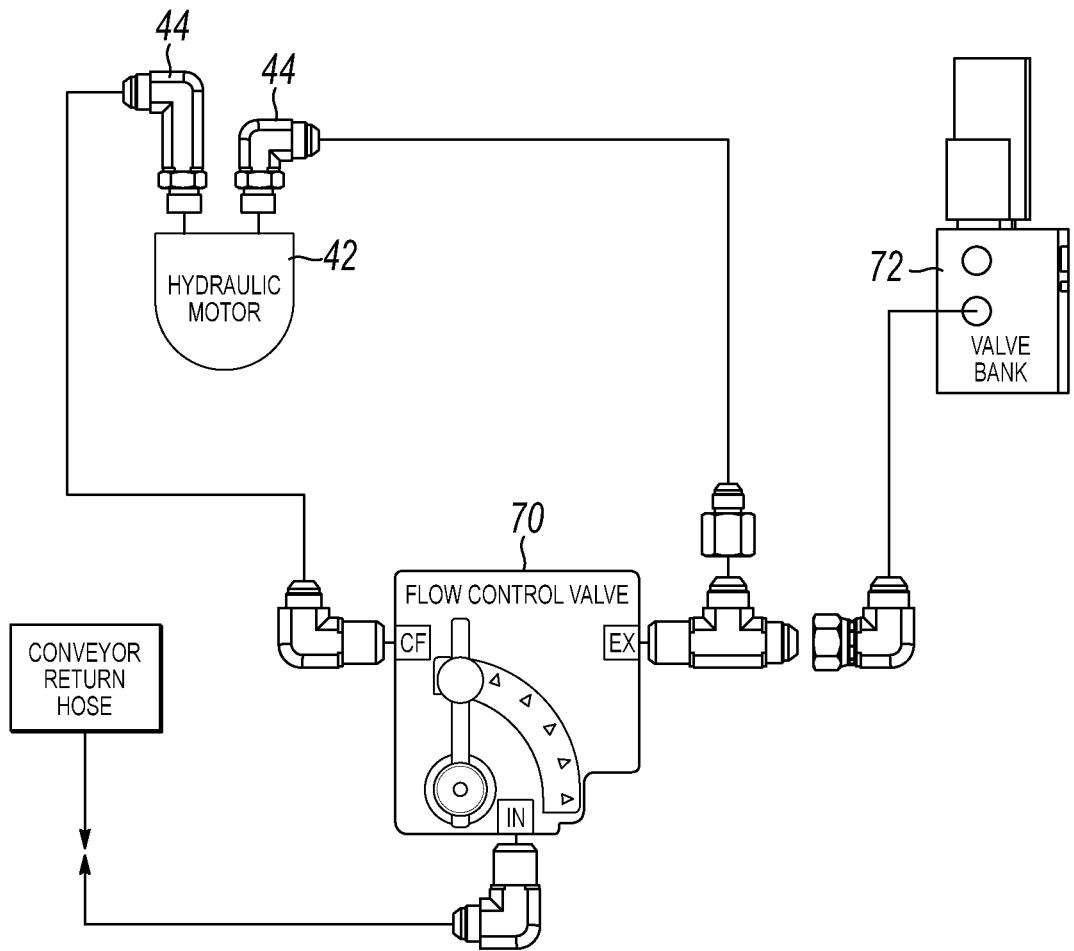
FIG. 8 is a schematic flow diagram view illustrating one embodiment of hydraulics that may be used with the hydraulic motor of the talc applicator of this invention.

As noted above, it is advantageous to provide a hydraulic motor 42 for operating both the feed auger 16 and the agitator assembly 14 in the talc applicator 10. The hydraulic motor 42 can be fed hydraulic fluid in various manners, and two examples of the hydraulics are shown in schematic diagrams at FIGS. 8 through 10. Referring first to FIG. 8, a controller in the form of a flow control valve 70 is separately provided in the hydraulics circuit between the standard valve bank 72 (which may be used to control elements of other agricultural equipment such as the seed tender as well) and the hydraulic motor 42. The flow control valve 70 operates to vary the amount of hydraulic fluid flow rate is delivered to the hydraulic motor 42, thereby allowing for variations in speed for the feed auger 16 delivering talc from the talc applicator 10.

Figure 9:
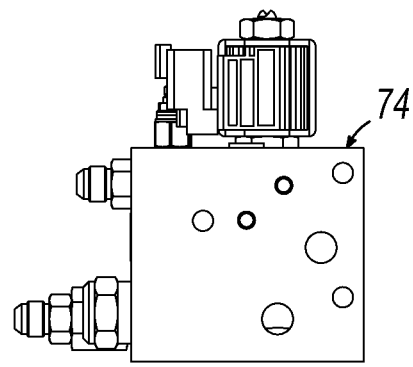
FIG. 9 is a side view of a proportional control device that may be used with the hydraulics of the talc applicator in another embodiment.
Figure 10:
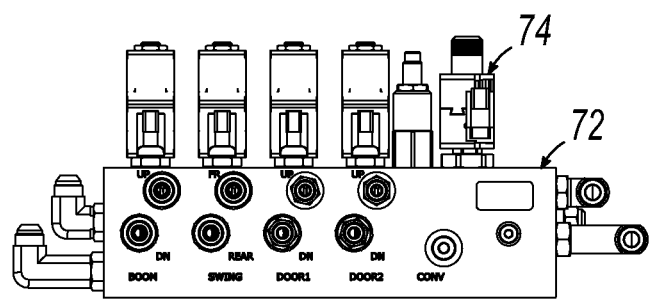
FIG. 10 is a side view of the valve block used with the talc applicator having the proportional control device of FIG. 9.

Now referring to FIGS. 9 and 10, in another embodiment, the separate flow control valve 70 is replaced by a proportional control device 74 (in the form of a cartridge or block) that is bolted on to one end of the standard valve bank 72, this proportional control device 74 defining the controller in this embodiment. The proportional control device 74 advantageously allows for just two hoses to run between the hydraulic motor 42 of the talc applicator 10 and the central valve structure typically present in these agricultural systems. This arrangement provides easier assembly and less complexity than the hydraulics of FIG. 8, and the proportional control device 74 can be electronically controlled remotely in accordance with variations in speed of the seed tender or other agricultural equipment. These are but two examples provided for how the hydraulic motor 42 can be operated and actuated, and one skilled in the art will readily understand other configurations are possible within the scope of this invention. Regardless of the hydraulics supply system chosen, the talc applicator 10 can adjust for varying flow needs of talc by the other agricultural equipment.

The talc applicator 10 of the embodiments described above improves the field of chemical applicators for agricultural processes. In this regard, the combination of a feed auger 16 and an agitator assembly 14 that are simple-to-manufacture and concurrently driven by a hydraulic motor 42 leads to reliable delivery of talc at varying speeds and flow rates as may be demanded by other agricultural equipment such as seed tenders. Furthermore, the number of components that could fail or need periodic maintenance is reduced as compared to conventional designs, thereby improving the reliability further. Talc or another similar chemical can be delivered to downstream agricultural equipment and processes regardless of whether that talc is free flowing and what the ambient environmental conditions currently are. To this end, the talc applicator 10 of the embodiments described above is capable of use in further contexts where these technical objectives and advantages can be applied in a useful manner.

While the present invention has been illustrated by a description several exemplary embodiments and while these embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the general inventive concept.

What is claimed is:

1. A talc applicator configured for use with agricultural equipment, comprising:
    a supply hopper including an inlet and a plurality of sidewalls extending to a trough;
    a discharge in communication with the trough;
    a feed auger extending through the trough and the discharge, the feed auger being driven to rotate to force flow of talc from the supply hopper into and through the discharge for delivery to other agricultural equipment, the feed auger further comprising a tubular conduit, a fighting extending through the tubular conduit, and a drive element configured to rotate the fighting; and
    an agitator assembly positioned in the supply hopper adjacent to and immediately above the feed auger and the trough, the agitator assembly further comprising a drive gear, which is engaged with the drive element of the feed auger to be driven concurrently with the feed auger, and an elongated agitator element connected to the drive gear for rotation therewith, the agitator element including at least two elongate bars, each of the elongate bars connected to and extends from the drive gear so as to be perpendicular to a plane defined by the drive gear and parallel to an axis through the feed auger, the agitator element further including a plurality of angled crossbars extending between and connecting the at least two elongate bars to one another, wherein each of the angled crossbars is L-shaped and the angled crossbars are spaced from one another along a longitudinal length of the agitator element and the angled crossbars are each located within a plane parallel to the drive gear,
    the agitator element being rotated to assist with flow of talc in the supply hopper into the trough for movement and delivery by the feed auger when the feed auger is rotated by the drive element, wherein during rotation of the agitator element, the elongate bars remain parallel to the axis through the feed auger and the angled crossbars remain parallel to the drive gear.

2. The talc applicator of claim 1, wherein the plurality of angled crossbars includes three crossbars, a first of which is located at the drive gear, a second of which is located at an opposite end of the at least two elongate bars, and a third of which is located between the first and second.

3. The talc applicator of claim 1, wherein the agitator element further comprises an elongate curved bar connected to one of the at least two elongate bars, the elongate curved bar configured to wipe across sidewalls of the supply hopper adjacent the trough.

4. The talc applicator of claim 1, wherein the drive element of the feed auger includes a sprocket gear that rotates whenever the flighting is rotated, and the sprocket gear is meshed in engagement with the drive gear of the agitator assembly.

5. The talc applicator of claim 1, wherein the drive element of the feed auger is actuated by a hydraulic motor.

6. The talc applicator of claim 5, further comprising:
    a controller that operates to vary a speed of the hydraulic motor to allow for varying rates of feed of talc from the talc applicator to be achieved by the agitator assembly and the feed auger.

7. The talc applicator of claim 6, wherein the tubular conduit of the feed auger delivers talc to a conveyor moving seed to be planted by the other agricultural equipment, and the controller adjusts the speed of the hydraulic motor to be proportional to a speed of the conveyor moving seed.

8. The talc applicator of claim 6, wherein the controller includes at least one of a proportional control device or a control valve, such that the controller is configured to vary a flow of hydraulic fluid delivered to the hydraulic motor to vary the speed of the hydraulic motor.

9. The talc applicator of claim 1, wherein the fighting is a flexible fighting configured to stretch and contract along a longitudinal length of the tubular conduit.

* * * * *

UNITED STATES PATENT AND TRADEMARK OFFICE
CERTIFICATE OF CORRECTION

Page 1 of 1

PATENT NO. : 10,694,657 B2
APPLICATION NO. : 16/165397
DATED : June 30, 2020
INVENTOR(S) : Dustan Grieshop It is certified that error appears in the above-identified patent and that said Letters Patent is hereby corrected as shown below:

In the Claims

At Claim 1, Column 7, Lines 42-43, reads "fighting extending through the tubular conduit, and a drive element configured to rotate the fighting; and" and should read -- flighting extending through the tubular conduit, and a drive element configured to rotate the flighting; and --.

At Claim 9, Column 8, Lines 49-50, reads "The talc applicator of claim 1, wherein the fighting is a flexible fighting configured to stretch and contract along a" and should read -- The talc applicator of claim 1, wherein the flighting is a flexible flighting configured to stretch and contract along a --.

Signed and Sealed this
Eighth Day of September, 2020

Andrei Iancu
*Director of the United States Patent and Trademark Office*